Figure 1:
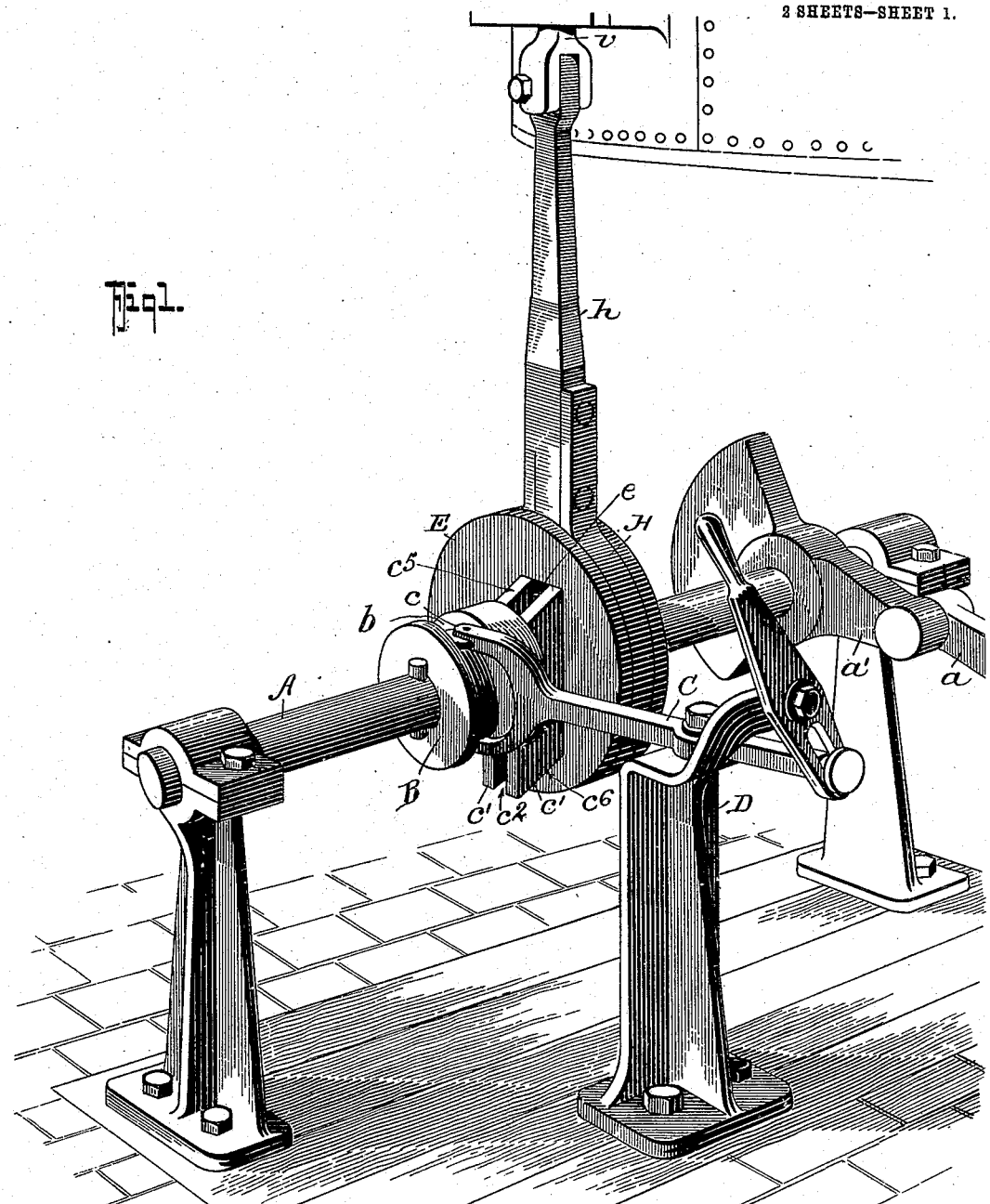

J. J. REDMAN.
VALVE GEAR.
APPLICATION FILED JAN. 21, 1909.

937,330.

Patented Oct. 19, 1909.
2 SHEETS—SHEET 1.

WITNESSES:
John T. Schrott
Charles H. Wagner

INVENTOR
John J. Redman
BY
Fred G. Dieterich & Co.
ATTORNEYS

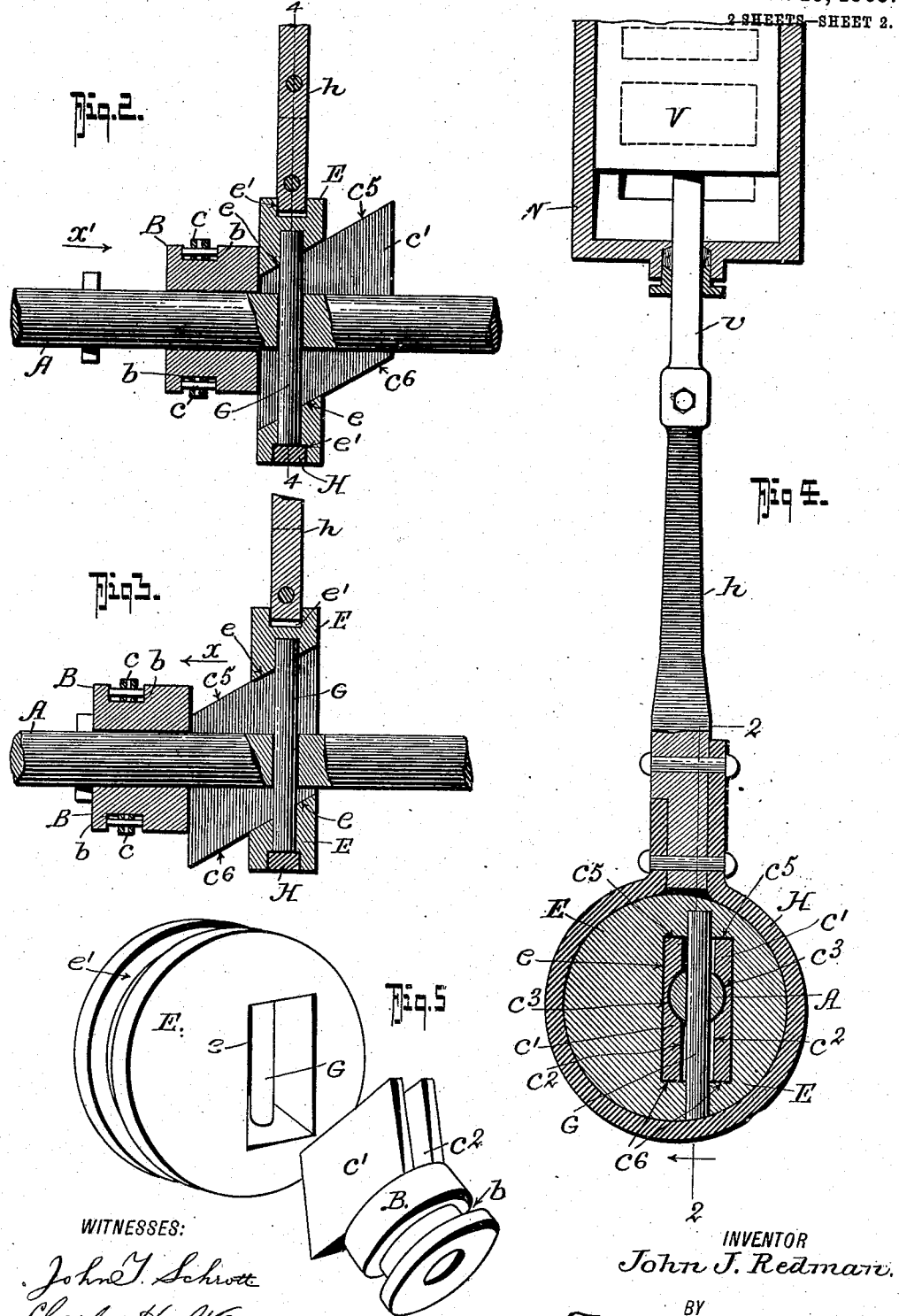

UNITED STATES PATENT OFFICE.

JOHN J. REDMAN, OF WITT, ILLINOIS.

VALVE-GEAR.

937,330.

Specification of Letters Patent. Patented Oct. 19, 1909.

Application filed January 21, 1909. Serial No. 473,435.

*To all whom it may concern:*

Be it known that I, JOHN J. REDMAN, residing at Witt, in the county of Montgomery and State of Illinois, have invented a new and Improved Valve-Gear, of which the following is a specification.

This invention which comprehends certain new and useful improvements in reversing gear mechanisms for steam engines, primarily has for its object to provide a gear mechanism of the character referred to, of a simple and compact nature, in which the shifting means is so slidably mounted on the engine shaft and has such coöperative connection with the eccentric, that the reversing of the gear can be almost instantly and positively effected, under a minimum frictional binding of the parts.

With the above and other objects in view, my invention consists in certain details of construction and peculiar combinations of parts, all of which will be hereinafter fully described, specifically pointed out in the appended claims and illustrated in the accompanying drawings, in which:—

Figure 1, is a perspective view that illustrates the general arrangement of my invention as applied for use. Fig. 2, is a transverse section of the same, taken practically on the line 2—2 on Fig. 4, looking in the direction of the arrow, and illustrates the gear shifting member in one adjustment. Fig. 3, is a similar view and shows the gear shifting means under another adjustment, and Fig. 4 is a vertical section on the line 4—4 of Fig. 2. Fig. 5, is a perspective view of the shifting member hereinafter referred to.

In the practical application of my invention the engine shaft A is mounted in suitable framing, it having the usual pitman $a$ and crank connection $a'$.

At a suitable point on the shaft A is slidably mounted a sleeve B formed with an annular groove $b$ to receive the forked end $c$ of a shifting lever C pivotally mounted on the framing D at such a point that it can be conveniently manipulated by the engineer.

Sleeve C has a flattened extension $c'$ of substantially rectangular shape, that is vertically slotted to straddle the shaft, the opposite walls of the slotway $c^2$ being horizontally concaved as at $c^3$ to form long bearings or seats for engaging the shaft, and whereby to form, as it were, in connection with the sleeve a bearing for the shaft the full length of the sleeve and its slotted extension, such arrangement of parts providing for a true bearing of the slidable member on its shaft and for overcoming any tendency of the slidable member to bind on the said shaft during the shifting operation.

E is the eccentric disk formed with an elongated opening $e$, perpendicular with respect to shaft A, and eccentric with respect to the axis of the disk, the said slot having such length and width as to fit on the slotted extension $c'$ of the sleeve B. For holding the disk E from binding on the extension C as it is shifted in the opening, a guide pin G projects from shaft A through the slotway $c^2$ and has its outer end fast on the disk E as clearly shown in Fig. 2. By reference to Fig. 2 it will also be seen that the disk E has the usual annular groove $e'$ to receive, loosely thereon, the eccentric yoke or strap H, the ends of which join with one end of a pitman $h$. The pitman $h$ in practice, connects with the stem $v$ of the slide valve V, also of any well known or approved type, sufficient of the valve chest W and the valve being shown in the drawings to illustrate the general application of my invention.

The opposite edges of the extension $c'$ are inclined, the inclines being in a parallel plane whereby to form, as it were, two oppositely disposed wedge or cam faces $c^5$—$c^6$ that alternately operate to shift the eccentric disk, it being obvious by reference to Fig. 3 that when the member B has been shifted in the direction of arrow $x$ to the position shown the eccentric E assumes its highest position with respect to the shaft A and that when the sleeve B has been reversed in the direction indicated by the arrow $x'$ and as shown in Fig. 2, the eccentric E will be at the lowest position with respect to shaft A.

I am aware that wedges slidably mounted on the main shaft for engaging a slotted eccentric disk on the shaft have been heretofore provided.

My invention, so far as I know, differs from what has heretofore been employed, in the peculiar construction of the sleeve with the flattened member and the specific means shown for locking the sliding member to turn with the shaft and for holding it to slide true and firmly on the shaft, without the danger of binding and under a simple manipulation of a single actuating lever.

In the practical arrangement of my invention the slotway *e* is far enough to one side of the axis of the disk to give the lead of the valve required.

Having thus described my invention, what I claim is:

1. In a reversing gear for engines, a shaft, a sleeve slidably mounted on the shaft, said sleeve having a flattened bifurcated extension that straddles the shaft and whose opposite members have seats for engaging the opposite sides of the shaft, a disk mounted on the shaft having a rectangular slot disposed eccentric to its axis, said slot being shaped to receive the bifurcated extension of the sleeve, a single guide rod mounted in the bifurcated end of the extension, said rod passing through an aperture in said shaft, and its ends being held in apertures in said disk, said disk having an annular groove, an eccentric yoke that engages the groove and a pitman connected with the yoke, together with means connected with the shaft sleeve for shifting it.

2. In a reversing gear for engines, the combination with a shaft, a sleeve slidably mounted on the shaft, said sleeve having a flattened bifurcated extension that straddles the shaft and whose opposite members have seats for engaging the opposite sides of the shaft, a disk mounted on the shaft having a rectangular slot disposed eccentric to its axis, said slot being shaped to receive the bifurcated extension of the sleeve, a single guide rod mounted in the bifurcated end of the extension, and having its ends secured in the eccentric disk, said disk having an annular groove, and an eccentric yoke that engages the groove and a pitman connected to said yoke and means connected with the shaft sleeve for shifting it.

JOHN J. REDMAN.

Witnesses:
E. H. RANSDELL,
R. W. SAMPLE.